United States Patent
Bentrim et al.

(10) Patent No.: US 10,968,943 B2
(45) Date of Patent: Apr. 6, 2021

(54) SELF-CLINCHING FLOATING FASTENER

(71) Applicant: Penn Engineering & Manufacturing Corp., Danboro, PA (US)

(72) Inventors: Brian Bentrim, Furlong, PA (US); Jonathan Brunk, Philadelphia, PA (US); Thuan Huu Chau, Chalfont, PA (US); Trevor Fahy, Galway (IE); James Sutcliffe, Warminster, PA (US); David Quinn, Galway (IE)

(73) Assignee: Penn Engineering & Manufacturing Corp., Danboro, PA (US)

( * ) Notice: Subject to any disclaimer, the term of this patent is extended or adjusted under 35 U.S.C. 154(b) by 136 days.

(21) Appl. No.: 16/247,168

(22) Filed: Jan. 14, 2019

(65) Prior Publication Data

US 2019/0219092 A1  Jul. 18, 2019

Related U.S. Application Data

(60) Provisional application No. 62/617,543, filed on Jan. 15, 2018.

(51) Int. Cl.
*F16B 37/04* (2006.01)
*F16B 37/06* (2006.01)

(52) U.S. Cl.
CPC .......... *F16B 37/068* (2013.01); *F16B 37/044* (2013.01)

(58) Field of Classification Search
CPC .................................................... F16B 37/044
USPC .................................. 411/111–113, 166, 402
See application file for complete search history.

(56) References Cited

U.S. PATENT DOCUMENTS

| | | | | |
|---|---|---|---|---|
| 3,079,970 | A * | 3/1963 | Barry | F16B 37/068 |
| | | | | 411/113 |
| 3,180,387 | A * | 4/1965 | Dzus | F16B 39/36 |
| | | | | 411/111 |
| 3,646,982 | A * | 3/1972 | Cushman | F16B 33/004 |
| | | | | 411/82.5 |
| 4,929,136 | A * | 5/1990 | Mee | F16B 5/025 |
| | | | | 403/144 |
| 5,380,136 | A | 1/1995 | Copple et al. | |
| 6,637,993 | B2 * | 10/2003 | Murakami | F16B 5/0208 |
| | | | | 411/112 |
| 7,192,231 | B2 | 3/2007 | Blackaby | |
| 7,516,534 | B2 * | 4/2009 | Easterbrook | B21J 15/02 |
| | | | | 29/509 |
| 8,475,099 | B2 | 7/2013 | Bandis | |
| 2003/0118419 | A1 | 6/2003 | Easterbrook | |
| 2009/0010704 | A1 | 1/2009 | De Jesus et al. | |
| 2009/0129885 | A1 | 5/2009 | Csik et al. | |

* cited by examiner

*Primary Examiner* — Flemming Saether
(74) *Attorney, Agent, or Firm* — Gregory J. Gore, Esq.

(57) ABSTRACT

A floating fastener comprises a retainer and a captive nut held within a cavity of the retainer. The nut is star-shaped with four points spaced equally apart and with four valleys on the periphery of the nut between the points creating the overall star-shape of the nut. Likewise, the cavity in the retainer corresponds to the shape and contour of the nut but sized so that there is a substantial gap between them. Permissible lateral float of the nut can be maximized by employing a particular angularity of the sides of the valleys in relation to other dimensions of the fastener.

13 Claims, 6 Drawing Sheets

FIG. 5

T= thread major diameter
F= total float
R= retainer outer diameter $$R = 1.5 \times T + 2 \times F$$

or rearranged to find float:

$$F = \frac{R - 1.5 \times T}{2}$$

$$\text{Included Angle} = 90° + 2 \times \sin^{-1}\left(\frac{1.5 \times T \times \sin 45°}{\sqrt{(1.5 \times T)^2 + (R - F)^2 - 3 \times T \times (R - F) \times \cos 45°}}\right)$$

FIG. 7

| given: | | output: | |
|---|---|---|---|
| thread | outer diameter | float | angle |
| 0.164 | 0.450 | 0.102 | 180.0 |
| 0.164 | 0.475 | 0.115 | 176.0 |
| 0.164 | 0.500 | 0.127 | 172.3 |
| 0.164 | 0.525 | 0.140 | 168.9 |
| 0.164 | 0.550 | 0.152 | 165.6 |
| 0.164 | 0.575 | 0.165 | 162.7 |
| 0.164 | 0.600 | 0.177 | 159.9 |

| given: | | output: | |
|---|---|---|---|
| thread | float | outer diameter | angle |
| 0.164 | 0.100 | 0.446 | 180.6 |
| 0.164 | 0.120 | 0.486 | 174.3 |
| 0.164 | 0.140 | 0.526 | 168.7 |
| 0.164 | 0.160 | 0.566 | 163.7 |
| 0.164 | 0.180 | 0.606 | 159.2 |

SELF-CLINCHING FLOATING FASTENER

RELATED APPLICATION

This is a non-provisional patent application related to provisional patent application 62/617,543 entitled, "Self Clinching Floating Fastener" filed on Jan. 15, 2018 priority from which is hereby claimed.

FIELD OF THE INVENTION

This invention relates to internally threaded fasteners that attach to the aperture of a receiving panel by clinch attachment. These are commonly referred to as "clinch nuts". More specifically, the invention relates to clinch nuts that "float", that is ones that are held loosely in a retainer that allows a lateral adjustment of the nut while it is held to the retainer against rotation.

BACKGROUND OF THE INVENTION

As manufacturing become more and more cost competitive there is an ever increasing need for fastening systems which allow for a wider degree of manufacturing tolerance. Rapid mass-production of components often results is component dimensions which vary from the ideal specification. To accommodate this situation, fasteners which attach components accommodate such variations by allowing a range of misalignment. Internally threaded fasteners, i.e. nuts, are often supplied with a retainer that loosely hold the nut inside against rotation. Some examples include "cage nuts" and a category of "floating fasteners". Some of these fasteners have retainer attachment means that clinch to the receiving panel by the deformation of the panel material. Examples are those manufactured by Penn Engineering Corp. as shown in their sales bulletin entitled, "Floating Self-Clinching Fasteners". These fastener are constructed with a square nut held within a somewhat larger square cavity of a retainer with clinch attachment features. As relative torque is applied between the nut and the retainer, the corners of the nut bear against the inside of the retainer cavity to resist rotation of the nut.

As there is the need for the maximization of performance in all manufacturing, it is desired to provide a floating fastener with the greatest degree of float within the requirements of size and strength. This is a main object of the present invention.

SUMMARY OF THE INVENTION

In order to achieve the objects of the invention the floating fastener described below has been devised. In one embodiment the invention comprises a retainer and a captive nut. The nut is star-shaped with four points spaced equally apart, much like the square nut of the prior art except that there are four valleys on the periphery of the nut between the points creating its overall star shape. Likewise, the cavity in the retainer corresponds to the shape and contour of the nut's periphery but sized so that there is a substantial gap between them. It has been further discovered that permissible float can be maximized by employing a particular angularity of the sides of the valleys in relation to other dimensions of the fastener as will be described in more detail below.

More specifically, the applicant has devised a fastener comprising a retainer having a cavity for receiving an insert defined by a peripheral inner wall of the retainer, said retainer having attachment means on an outer wall thereof for attachment to a first object. The insert has means for attaching to a second object. The insert has a star shaped periphery with a plurality corners and valleys, each valley located between each of two adjacent corners. The shape of the retainer cavity corresponds to the shape of the insert periphery with a gap between them. This permits relative lateral movement between the insert and the retainer while resisting relative rotation by the interference between the insert corners and inwardly projecting elements on the inner wall of the retainer. A circular clip can captivate the insert to the retainer by engagement with a groove in the retainer inner wall whereby the insert is captivated between the clip and an end wall of the retainer.

In one embodiment, the fastener insert is an internally threaded nut and the retainer has an outer wall which has clinch features for receiving the cold flow of material from an attached object. The valleys between the corners of the insert have side surfaces with an included angle of less than 180 degrees and in one embodiment the angle is 169 degrees.

It is therefore an object of the invention to provide a floating clinch nut with the greatest amount of lateral float within the limits of other dimensional requirements. Other objects and advantages of the invention will be apparent to those of skill in the art. It should be understood that the embodiments described below in the drawings and description of the invention are exemplary and that a person skilled in the art may make many variations and modifications without departing from the spirit and scope of the invention. Accordingly, all such variations and modifications are intended to be included within the scope of the embodiments described herein.

BRIEF DESCRIPTION OF THE DRAWINGS

FIG. 5 is a depiction of a formula relating to the relative dimensions of fastener of the invention.

FIG. 7 is a chart showing the variations of dimensions according to the formula of FIG. 5.

DETAILED DESCRIPTION OF PREFERRED EMBODIMENTS

Figure 1:
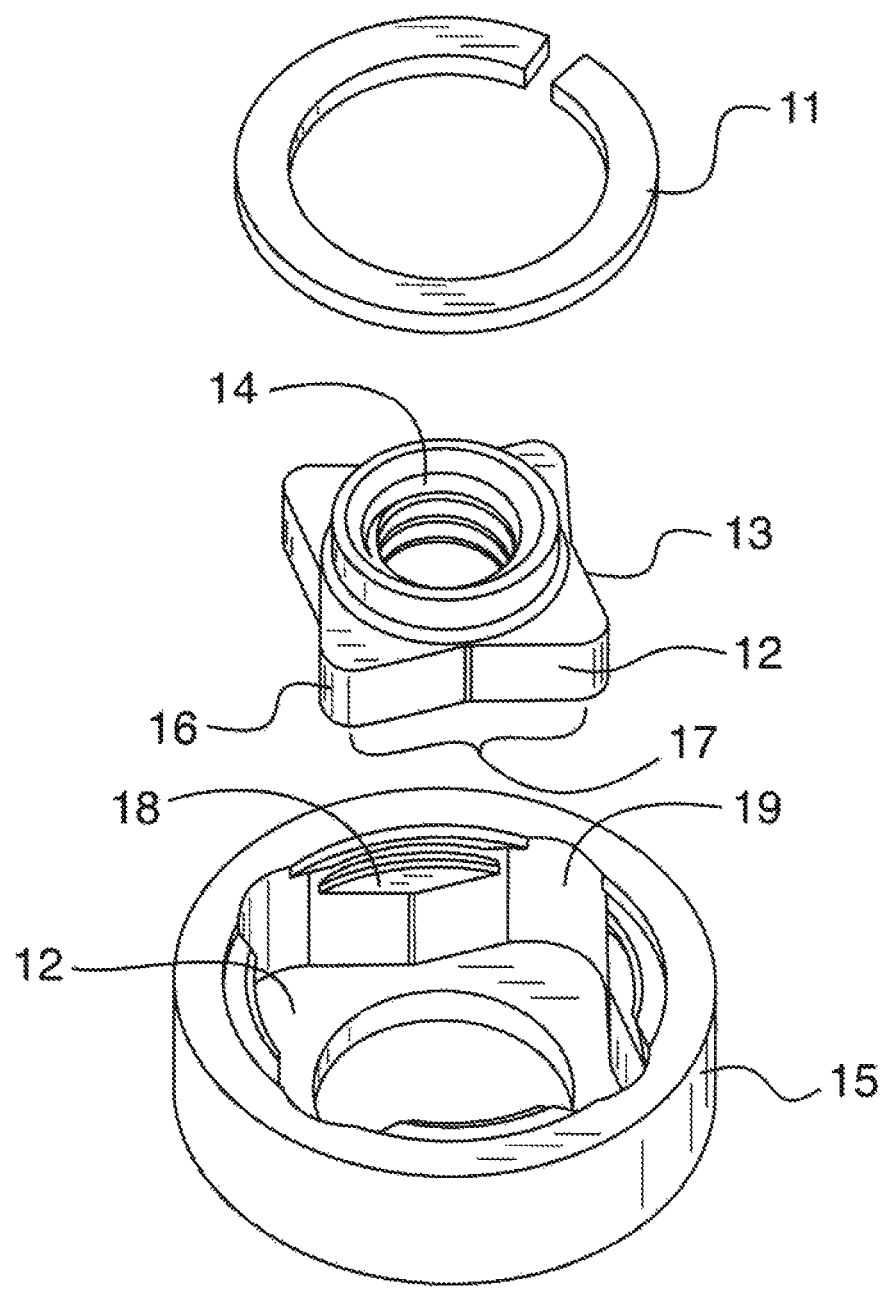
FIG. 1 is an exploded perspective of a floating clinch nut in accordance with a preferred embodiment of the invention.

Referring now to FIG. 1, the three main components of one embodiment of the invention are: an outer retainer 15, a threaded insert 13 such as a nut depicted in this embodiment, and a clip 11 which captivates the nut insert 13 within the retainer 15. The nut 13 is star-shaped with four corners 16 separated by a valleys 17 between adjacent corners. The valleys have angled side surfaces 12, which define an included valley insert angle referred to in FIGS. 5 through 8 described below. The insert in this embodiment is defined by a nut 13 that has an internal threaded bore 14 for receiving a bolt. The outer retainer 15 has a cavity 19 and a clip-receiving groove 18. The nut insert is captivated to the retainer between the clip 11 above and an end wall 12 of the retainer at the base of the retainer cavity 19 below it. The clip 11 is resilient and non-destructively releasable to facilitate assembly/disassembly of the fastener components. The structural relationship of these components is seen more clearly in FIGS. 3 and 4.

Figure 2:
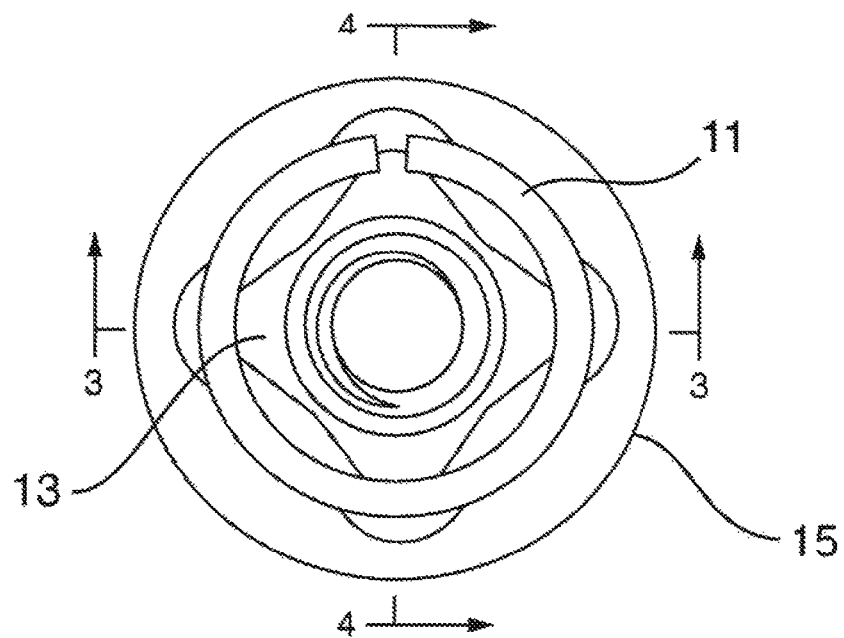
FIG. 2 is a top plan view of the fastener shown in FIG. 1.

In FIG. 2, we see the main components of the floating insert from above. The nut insert 13 is dimensioned significantly smaller than the retainer cavity creating a gap between them thus allowing the nut to move ("float") laterally in all radial directions.

Figure 3:
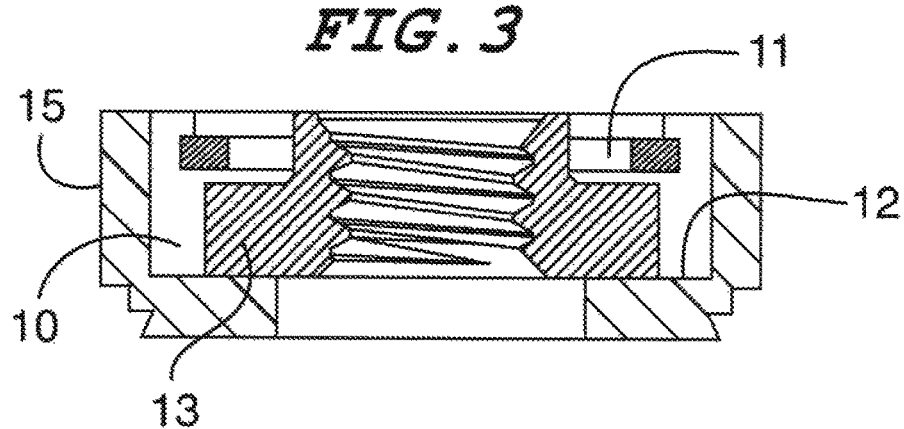
FIG. 3 is sectional view taken along lines 3-3 of FIG. 2.
Figure 4:
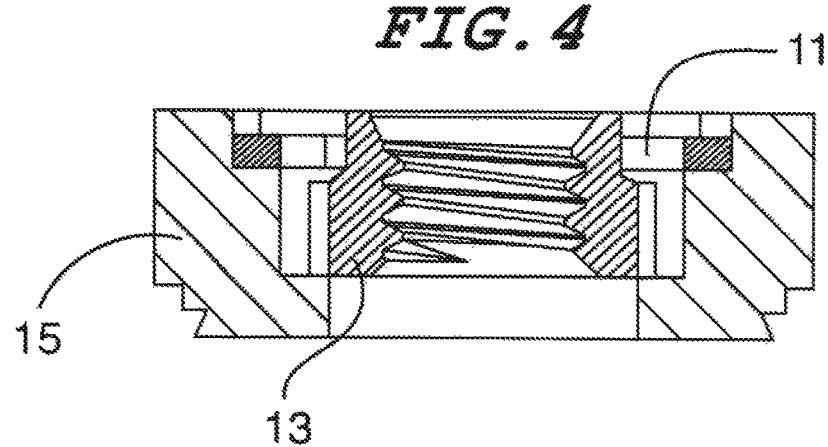
FIG. 4 is a sectional view taken along lines 4-4 of FIG. 2.

Referring now to FIGS. 3 and 4, the nut insert 13 is captivated within the retainer 15 between the clip 11 and an end wall of the retainer cavity 12. The lateral gap permits the insert to float within the retainer while rotation between the nut and the retainer is stopped by interference between the corners of the insert and inwardly projecting elements 10 of the peripheral inner wall of the retainer which defines the cavity.

Figure 6:
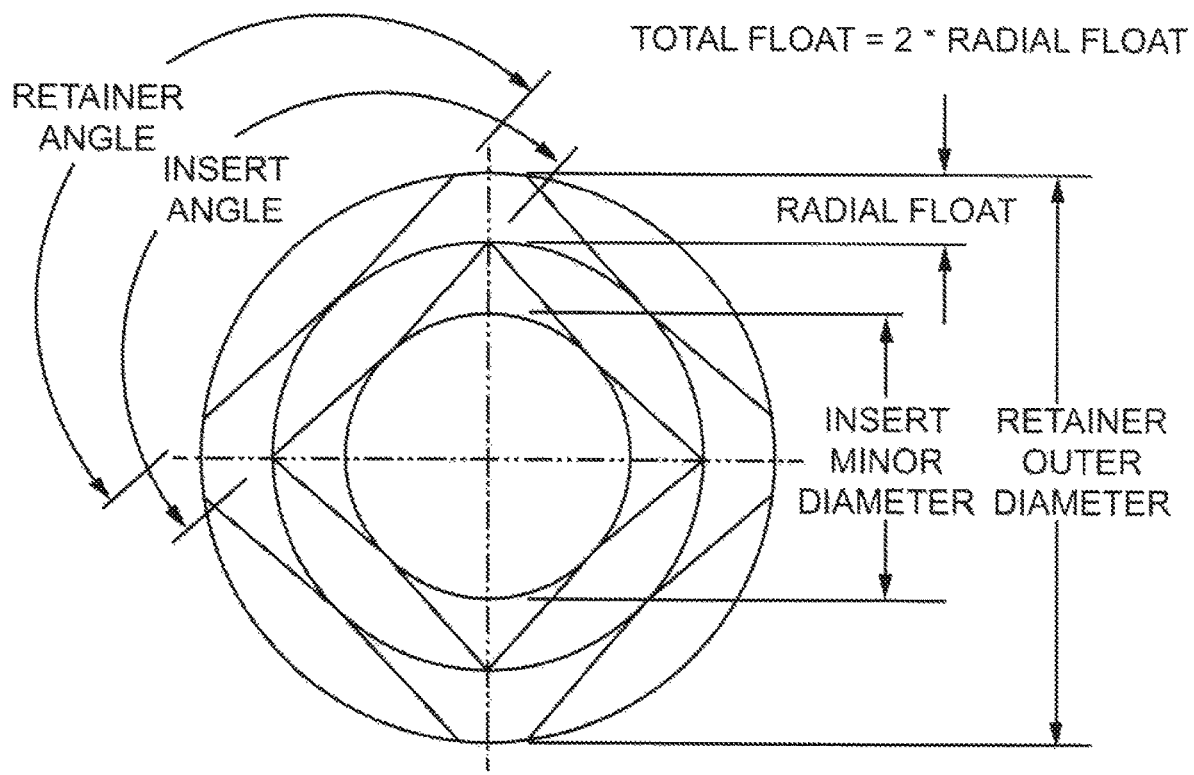
FIG. 6 is a depiction of the various dimensions and angles of the formula of FIG. 5.

In FIG. 5, we see the formula which expresses the relationship between the various design parameters which relate to those shown in FIG. 6 according to the four-pointed star configuration of the nut insert. The formula defines the dimensional relationships that can be used to determine the maximum float of the four-corner nut insert. The output of the formula shown in FIG. 5 is shown in the chart of FIG. 7 and the associated points in the graph of FIG. 8. Thus for one embodiment of the invention the float is equal to (R−1.5×T)/2.

Referring now to FIGS. 6 and 7, the terminology applied to the measurements expressed in the chart of FIG. 7 are described by the illustration of FIG. 6 including: the "retainer angle"; the "insert angle" (always the same); the "insert minor diameter"; the "retainer outer diameter" and the "radial float". The chart of FIG. 7 is in two upper and lower parts. The upper part shows the resulting float and insert/retainer angle given a specified thread size and the outer diameter of the retainer. The lower part shows the resulting retainer outer diameter and insert/retainer angles given a specified thread size and variations in float. As an example of one particular embodiment, taking the two parts of the chart together one can see that given a thread size of 0.164 and an outer retainer diameter of 0.525, the retainer/insert angle of approximately 169 degrees, plus or minus 3 degrees allowing for manufacturing tolerance, results in an overall geometry yielding maximum float for an insert having four corners. As the number of corners increases the amount of float decreases.

Figure 8:
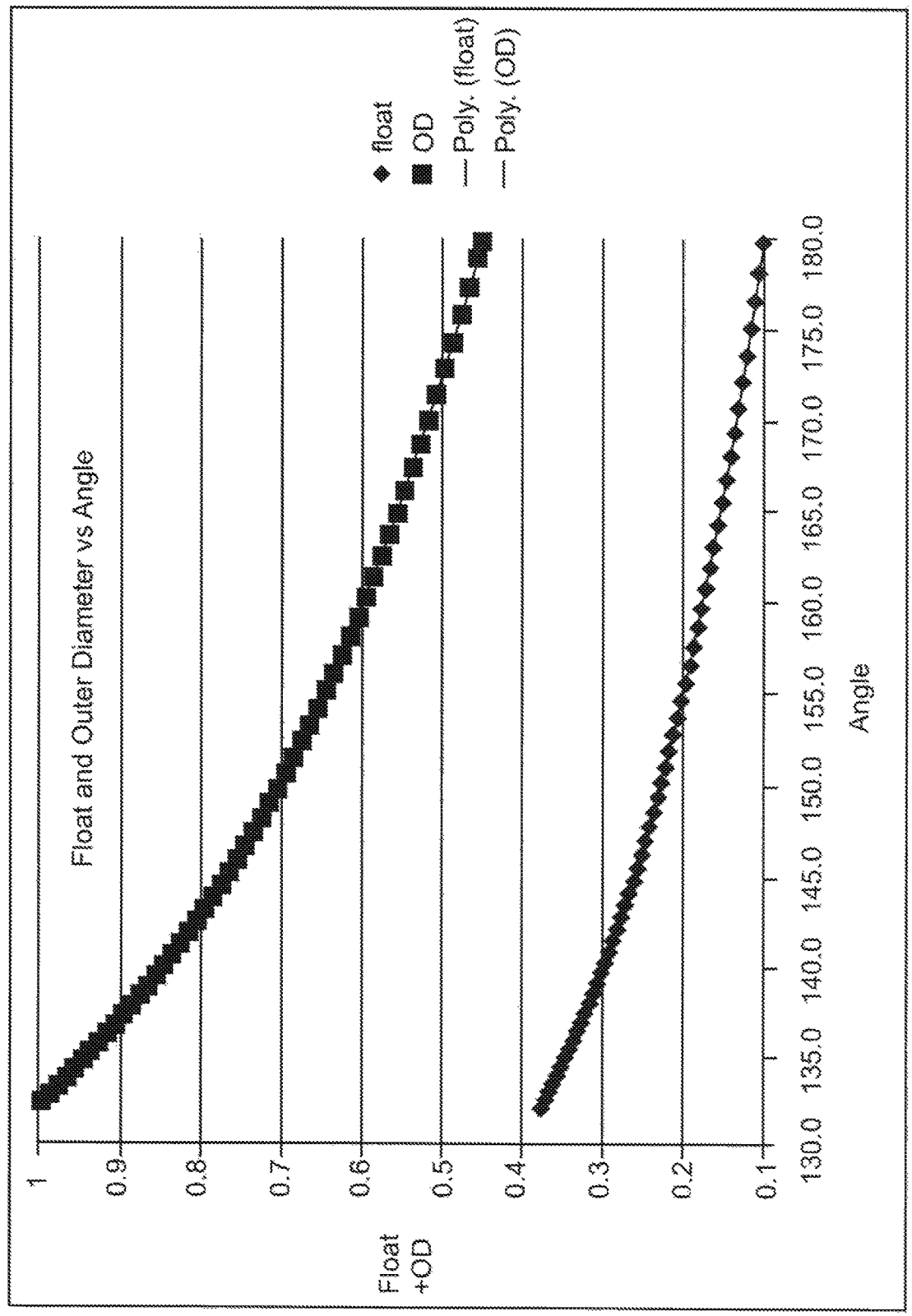
FIG. 8 is a graph showing the degree of float and outer diameter vs the insert valley included angle.

The graph of FIG. 8 shows points that lie along two lines. The top line represents the relationship between the retainer outside diameter and the insert angle for a given float while the bottom line represents the relationship between the amount of float and the insert angle given a retainer outside diameter.

A key distinction of the invention over the prior art is the valleys between the corners of the nut insert and the corresponding shape of the retainer cavity. Compared to the square-in-square configuration of the prior art without the valleys, for a given thread size and retainer diameter the lateral float of the invention can provide an increase of approximately 25%.

It will be apparent to those of skill in the art that the object of the invention has been achieved and that many variations and adaptations of what has been disclosed are possible. For example, the insert can be any type of fastener including bolts and studs. The disclosed retainer clip and be replaced by any suitable means for captivating the insert within the retainer. Furthermore, the retainer attachment means can be any suitable attachment means for a given application. Also, the composition of the various described components can be any suitable material including metal, plastic, etc. Thus, it must be understood that the embodiments disclosed are to be considered as exemplary only and the variations and adaptations thereof all fall within the scope and spirit of the invention which shall be determined only by the claims and their legal equivalents.

The invention claimed is:

1. A fastener, comprising:
a retainer having a cavity defined by a peripheral inner wall, said retainer having means on an outer wall thereof for attachment to a first object;
an insert with means for attaching a second object thereto, said insert having a star-shaped periphery with a plurality of radially pointing corners and valleys, each valley located between two adjacent corners and each corner defined by the sides of two adjacent valleys which meet at a point;
wherein the shape of the retainer cavity corresponds to the shape of the insert periphery with a gap between them permitting relative lateral movement while resisting relative rotation by the interference between the insert corners and the inner wall of the retainer; and means for captivating the insert within the retainer.

2. The fastener of claim 1 wherein the means for captivating the insert is a resilient non-destructively releasable clip.

3. The fastener of claim 2 wherein the clip is circular and engages a groove in the retainer inner wall.

4. The fastener of claim 2 wherein the insert is captivated between the clip and an end wall of the retainer at the base of the cavity.

5. The fastener of claim 1 wherein the means for attaching a second object to the insert is an internally threaded bore of the insert.

6. The fastener of claim 5 wherein the amount of total lateral float is equal to the formula (R−1.5×T)/2 where R equals the retainer outer diameter and T equals the major thread diameter of the insert bore.

7. The fastener of claim 1 wherein the retainer outer wall attachment means are clinch features for receiving the cold flow of material from the first object.

8. The fastener of claim 7 wherein the retainer outer wall is circular.

9. The fastener of claim 1 wherein the means for attaching the second object to the insert comprises an externally threaded stud integral with the insert.

10. The fastener of claim 1 wherein the insert has four corners and angled planar side surfaces on opposite sides of each of the valleys defining included obtuse angles of less than 180 degrees.

11. The fastener of claim 10 wherein the included angle is approximately 169 degrees plus or minus 3 degrees.

12. The fastener of claim 10 wherein the included angles are all equal.

13. The fastener of claim 1 wherein relative rotation between the retainer and the insert is resisted by the contact between the insert peripheral corners and inwardly projecting elements on the retainer inner wall.

* * * * *